United States Patent [19]

Hulyer

[11] 3,739,371

[45] June 12, 1973

[54] CROSS ADDRESSED BISTABLE DISPLAY PANEL WITH SELECTABLE BILEVEL SUSTAINING BIAS CIRCUIT

[75] Inventor: Michael George Hulyer, Croydon, England

[73] Assignee: U.S. Philips Corporation, New York, N.Y.

[22] Filed: Nov. 2, 1970

[21] Appl. No.: 86,147

[30] Foreign Application Priority Data

Oct. 31, 1969 Great Britain .................. 53,603/69

[52] U.S. Cl. ..... 340/324, 315/169 TV, 340/173 PL

[51] Int. Cl. .............................................. G11c 7/00

[58] Field of Search .................. 340/324 R, 324 M, 340/173 PL; 315/169 TV

[56] References Cited

UNITED STATES PATENTS

| | | | |
|---|---|---|---|
| 3,559,190 | 1/1971 | Bitzer et al. | 315/169 TV |
| 3,559,307 | 2/1971 | Barrekette et al. | 340/324 R |

*Primary Examiner*—John W. Caldwell
*Assistant Examiner*—Marshall M. Curtis
*Attorney*—Frank R. Trifari

[57] ABSTRACT

In a cross point display matrix of the storage type means are provided for shifting the common bias voltage to different levels during the write and erase operations. Shifting of the bias voltage permits the application of higher amplitude addressing pulses for both the write and erase operations.

3 Claims, 15 Drawing Figures

Patented June 12, 1973

3,739,371

6 Sheets-Sheet 1

INVENTOR.
MICHAEL GEORGE HULYER

BY
Frank R. Trifari
AGENT

Patented June 12, 1973 3,739,371

6 Sheets-Sheet 2

INVENTOR.
MICHAEL GEORGE HULYER

BY

AGENT

*INVENTOR.*
MICHAEL GEORGE HULYER
*BY*
AGENT

*INVENTOR.*
MICHAEL GEORGE HULYER

*BY* [signature]

AGENT

INVENTOR.
MICHAEL GEORGE HULYER

BY

AGENT

Patented June 12, 1973 3,739,371

6 Sheets-Sheet 6

*INVENTOR.*
MICHAEL GEORGE HULYER

*BY* Frank R. Trifari

AGENT

CROSS ADDRESSED BISTABLE DISPLAY PANEL WITH SELECTABLE BILEVEL SUSTAINING BIAS CIRCUIT

This invention relates to electrical display devices of the kind comprising a two-dimensional matrix of light-emitting elements, for example glow discharge cells or light-emitting diodes, which are connected at respective cross-points formed by two groups of coordinate conductors where each light emitting element can be illuminated selectively by suitable energizing signals applied concurrently to the two conductors, one in each group, between which the element is connected, by an addressing circuit arrangement of the device.

Two-dimensional matrices of glow discharge cells for electrical display devices of the above kind are described in U.S. Pat. specification No. 1,153,673 corresponding to U.S. Pat. No. 3,553,458 and in co-pending patent application No. 46,406/67 corresponding to U.S. Pat. application Ser. No. 108,965. The two-dimensional matrix described in the above-identified patent application is a small 5 × 7 cell matrix of glow discharge cells and is suitable for displaying one alpha-numeric character. A plurality of similar small cell matrices can be used to form a composite panel of larger size suitable for displaying a relatively large number of alpha-numeric characters simultaneously. A typical large size panel may comprise a 200 (row) × 200 (column) two-dimensional matrix of glow discharge cells. Assuming that each character region of this larger size panel comprises 6 × 8 = 48 cells, of which 5 × 7 = 35 are active cells for character formation and the remaining cells provide guard bands for spacing apart adjacent characters and adjacent lines of characters, then 25 lines of 33 alpha-numeric characters (825 characters in all) can be displayed on the panel simultaneously.

The words "row " and "column" are used, and will be so used hereinafter, solely to distinguish between the co-ordinate lines of light-emitting elements which form the two-dimensional matrix of an electrical display device of the kind referred to. Thus, either of the two groups of co-ordinate lines of elements can be termed "row" elements with the elements of the other group being termed "column" elements. The two groups of co-ordinate conductors which form the cross-points will be referred to, correspondingly, as "row" conductors and "column" conductors.

The addressing circuit arrangement of an electrical display device of the kind referred to is required to address the two-dimensional matrix of the device with energizing signals appropriate for illuminating selectively the light-emitting elements of the matrix to provide a visual display of alpha-numeric characters or other information. The selective energization of the light-emitting elements to produce the visual display can be effected by addressing each row of elements in turn with energizing signals applied to the row conductors in a recurrent scanning cycle and by arranging that during the period that each row is being addressed, the columns of elements are addressed selectively with energizing signals applied to selected column conductors which correspond to those elements in the row that are to form discrete parts of the characters or other information to be displayed. This addressing of the columns is determined by coded electrical signals that represent the characters or other information to be displayed. Thus, those elements, and only those elements, are addressed with coincident energizing signals and are therefore illuminated. Assuming that a plurality of lines of characters, with each line containing a plurality of characters, are to be displayed, and assuming that each line of characters extends over several rows (e.g., 7) of light-emitting elements, then it will be appreciated that as the rows are addressed in turn in the scanning cycle, the characters in each line are built-up row-by-row as a whole, and the lines of characters are built-up line-by-line in succession. Thus, with a sufficiently fast scanning rate, the effect will be the visual display of the plurality of lines of characters simultaneously. Electrical display devices which employ this recurrent scanning mode of operation are described in co-pending patent application Ser. No. 52,441, filed July 6, 1970.

An electrical display device of the kind referred to can also be adapted for operation in a so-called "storage mode" provided that the light-emitting elements of the matrix have a bistable characteristic such that they can be held illuminated, following energization, by a lesser voltage potential than that required for their initial energization. Gas discharge diodes in the form of glow discharge cells have a bistable characteristic which is suitable for this storage mode of operation. Semiconductor Ga As diodes for infra-red displays and semiconductor GA AsP diodes for visible red light displays can have a bistable characteristic which is suitable for this storage mode of operation, but for the sake of convenience the invention will be described hereinafter mainly with reference to glow discharge cells.

In this "storage mode" of operation, an individual current limiting resistance is provided in series with each glow discharge cell of the matrix. The glow discharge of individual cells is switched on and off selectively by the application of suitable voltage pulses to the appropriate row and column conductors to which the cells are connected as a cross bar matrix. The anodes and cathodes of the conductors X and Y axes, respectively. Hereinafter, the voltage pulses for switching on the cells will be referred to as write pulses ($V_W$), and those for switching-off the cell will be referred to as erase pulses ($V_E$). A cell which has been switched on can be maintained "on" after the termination of the voltage write pulses by applying across the series connection of the cell and a limiting resistance a bias voltage ($V_B$) which is greater than the minimum maintain voltage ($V_M$) of the cell, but less than the strike voltage ($V_S$) which is required to ignite the glow discharge of the cell (i.e., switch-on the cell).

The pulse amplitudes of the write pulses ($V_W$) and bias voltage ($V_B$) can be chosen as shown in FIG. 1 of the drawings. One write pulse on either cross bar in conjunction with the bias voltage must not be sufficient to ignite any cell of the matrix, whereas two coincident write pulses must exceed the strike voltage ($V_S$) of any appropriate cell. When considering a practical matrix, the tolerances on write pulse amplitudes and bias voltage must take into account the following inequalities due to maximum and minimum values of strike and maintain voltages:

$$V_B + V_W < V_S\,(min)$$

(i)

$$V_B + 2V_W > V_S\,(max)$$

Hence $$V_W > [V_S(max) - V_S(min)].\ i.e.$$

Each write pulse must therefore exceed the spread in the strike voltages of the matrix.

From (i) $V_B < V_S(min) - V_W$ $$i.e.,\ V_B < V_S(min) - [V_S\ (max) - V_S(min)] \quad (ii)$$

The erase conditions are similar in that two coincident voltage pulses are used to reduce the voltage across a selected discharge cell to a value below the maintain voltage. The bias voltage must therefore be sufficiently large for a single erase pulse not to extinguish any cell. For erase:

$$V_B - V_E > V_M(max) \quad (iii)$$

$$V_B - 2V_E < V_M(min)$$

$$V_E > [V_M(max) - V_M(min)],\ i.e.,$$

Each erase pulse must therefore exceed the spread in the maintain voltages of the matrix.

From (iii) $V_B > V_M(max) + V_E$

Hence $$V_B > V_M(max) + [V_M(max) - V_M(min)] \quad (iv)$$

From (ii) and (iv)

$$V_S(min) - V_M(max) > [V_S(max) - V_S(min)] + [V_M(max) - V_M(min)]$$

The "gap" between $V_S$(min) and $V_M$(max) must therefore exceed the sum of the strike and maintain voltage spreads. This is a stringent condition for a large matrix to meet.

The present invention provides a means of satisfying conditions (ii) and (iv) separately and not simultaneously.

According to the present invention, there is provided an electrical display device of the kind referred to which is arranged and adapted for operation in the storage mode (as hereinbefore defined), wherein drive circuits for addressing the matrix of the device with write and erase pulses include means for producing across each light-emitting element a first bias voltage when write pulses are to be applied to the element and a second bias voltage when erase pulses are to be applied to the element, said first and second bias voltages having respective values permitting the use of larger amplitude write and erase pulses than would be possible with a fixed bias voltage having regard to the strike and maintain voltage spreads of the elements of the matrix.

In carrying out the invention said first bias voltage is preferably of sufficiently low value to permit write pulse amplitudes to be used such that the gap between the minimum strike voltage and the maximum maintain voltage of the matrix need be just greater than the strike voltage spread to satisfy the requirements of the write pulses, while said second bias voltage is preferably of sufficiently high value to permit erase pulse amplitudes to be used such that the gap between the minimum strike voltage and the maximum maintain voltage of the matrix need be just greater than the maintain voltage spread to satisfy the requirements of the erase pulses.

In further considering the nature of the invention and in describing a preferred embodiment thereof, reference will be made by way of example to the remaining figures of the drawings filed with the Provisional Specification and to the single figure of the accompanying drawing.

In the drawings:

FIG. 3 shows a schematic diagram for an electrical display device of the kind referred to;

Figure 1:
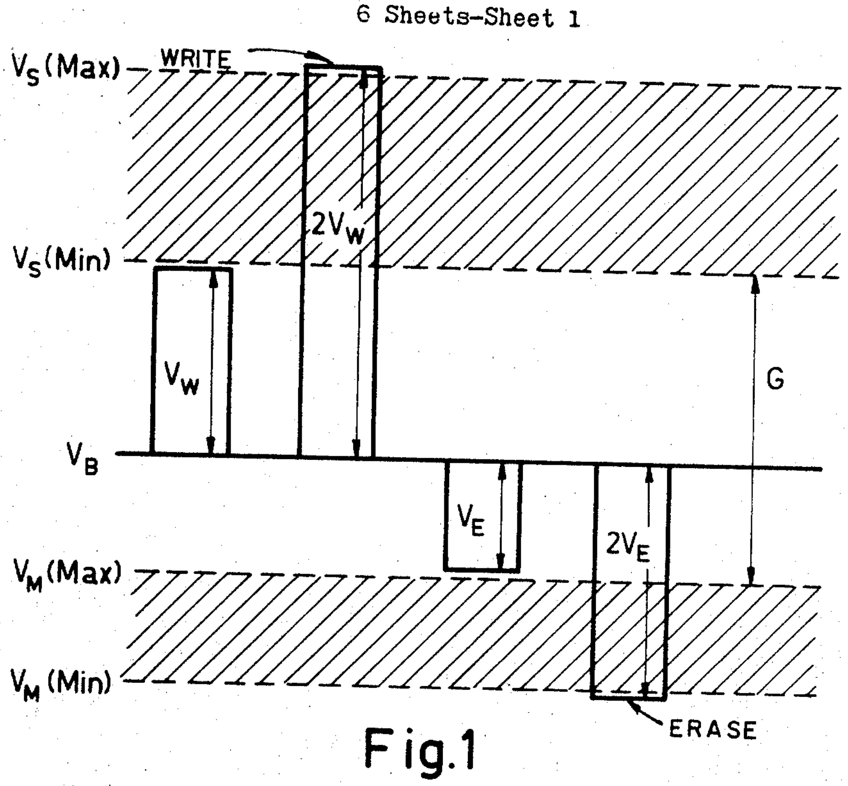
FIG. 1 shows, as aforesaid, pulses required for fixed bias address conditions of a glow discharge cell.
Figures 4, 5A:
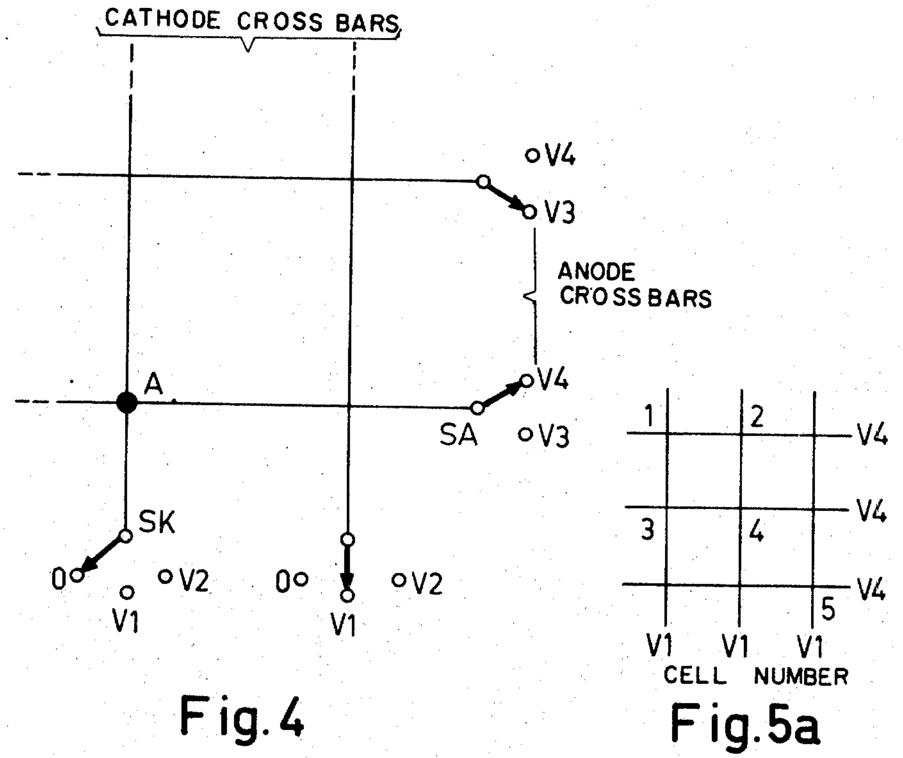
FIG. 4 shows a "3-pulse" switch network in conformity with the invention.
Figure 5B:
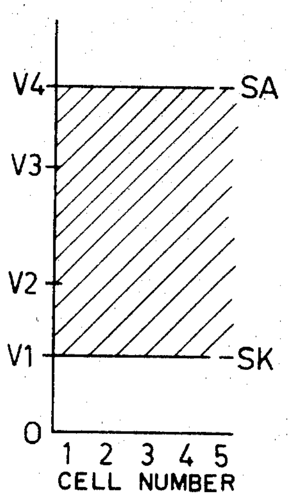
Figure 5C:
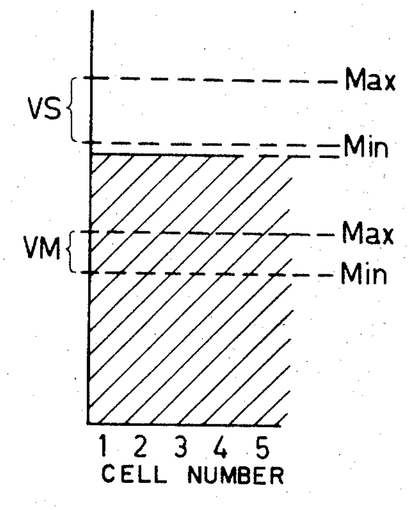
Figure 6A:
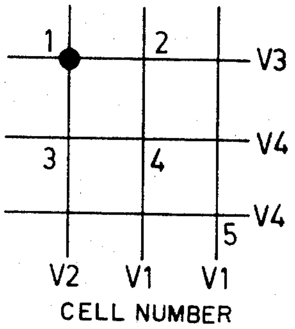
Figure 6B:
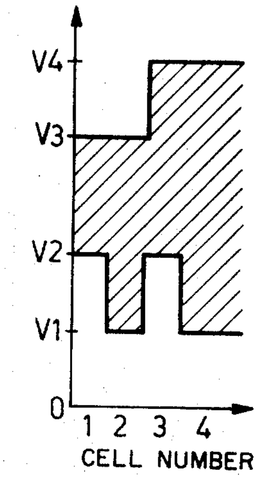
Figure 6C:
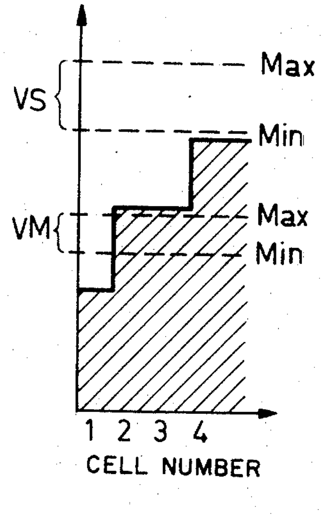
Figure 7A:
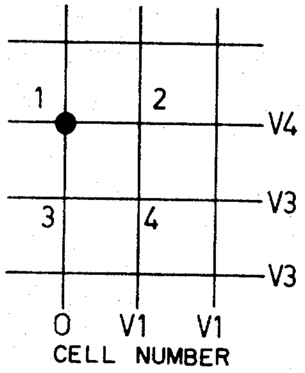
Figure 7B:
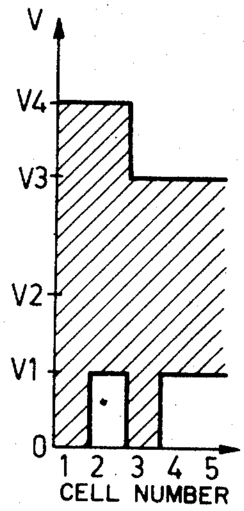
Figure 7C:
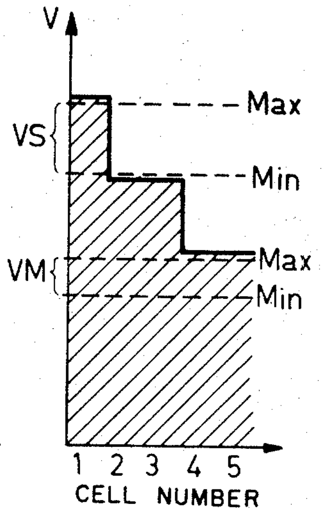
Figure 8:
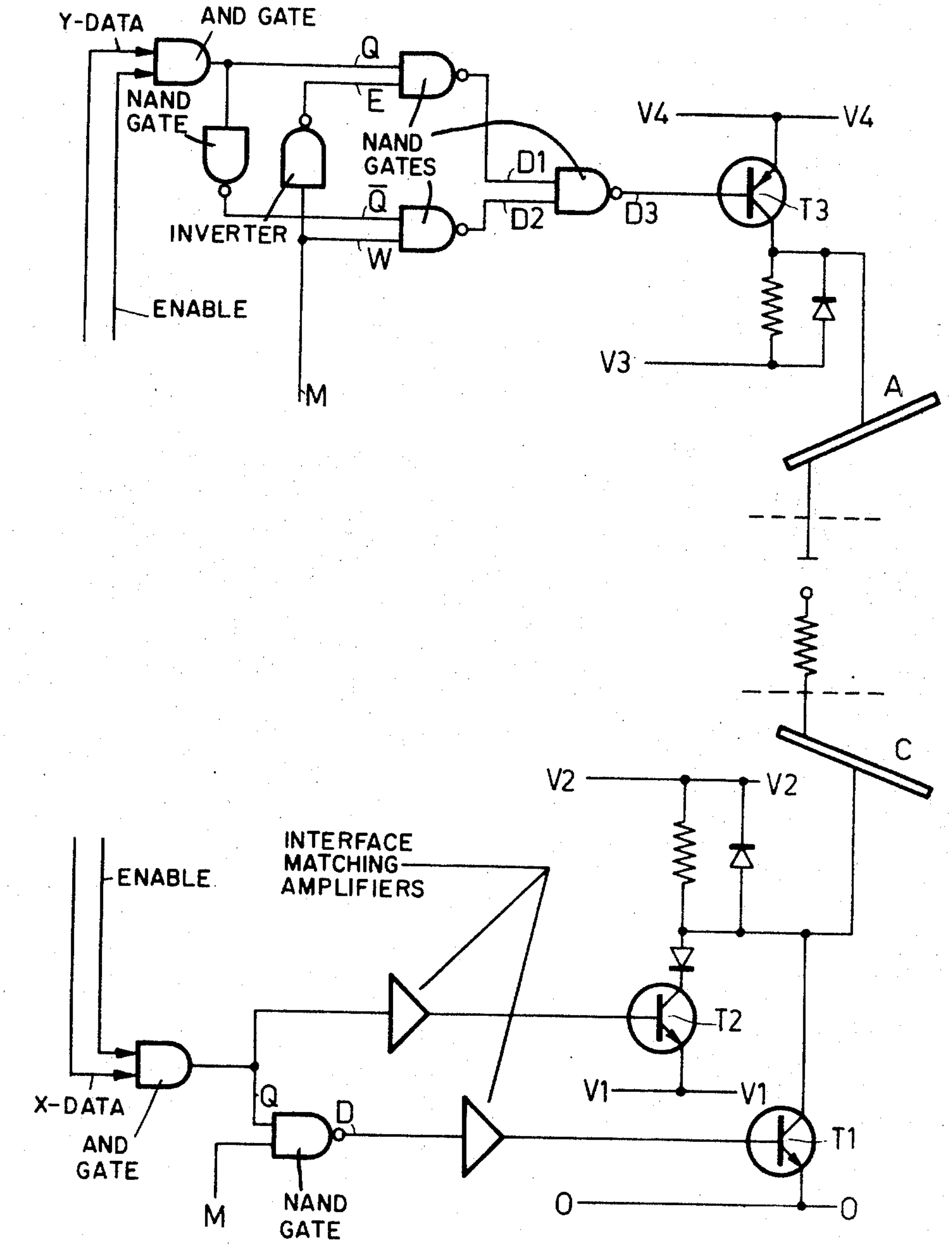
Figure 9:
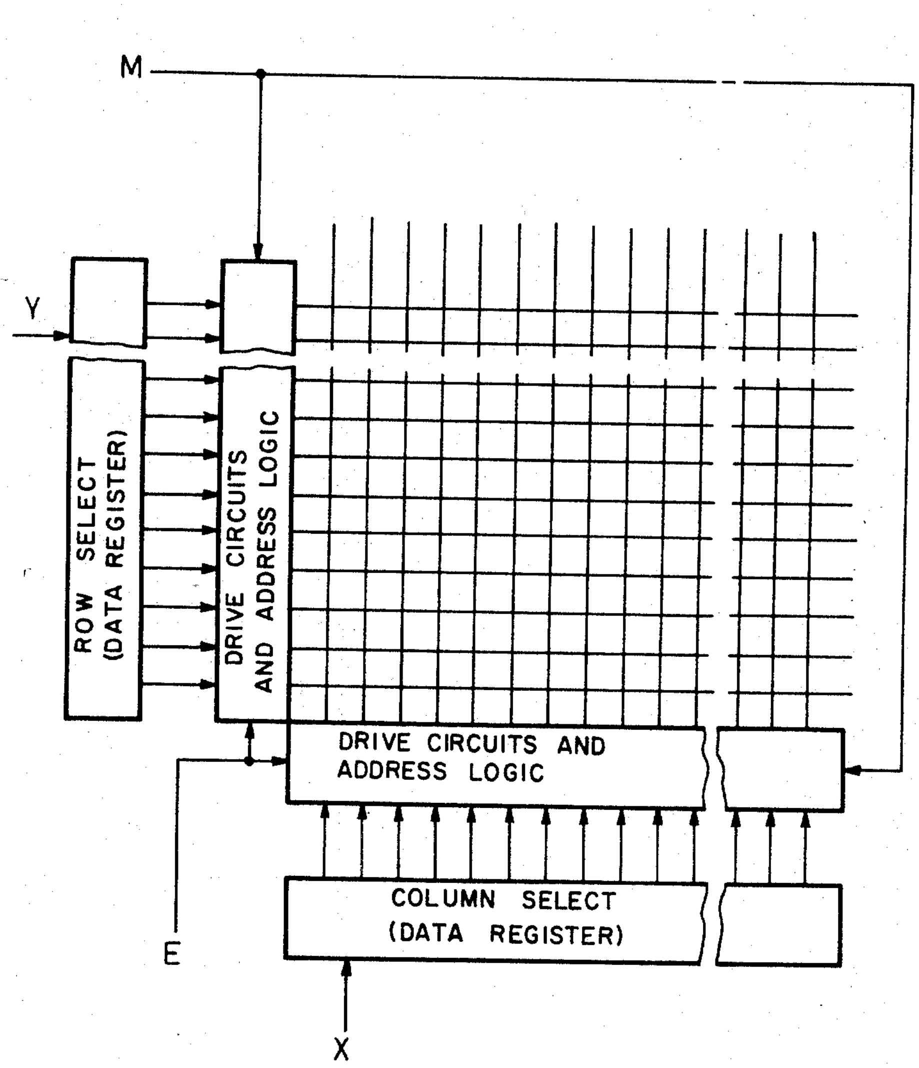

FIGS. 5*a*, 5*b* & 5*c* show graphically the "storage" conditions of a glow discharge cell of the switch network of FIG. 4;

FIGS. 6*a*, 6*b* & 6*c* show graphically the "erase" conditions of a glow discharge cell of the switch network of FIG. 4;

FIGS. 7*a*, 7*b* & 7*c* show graphically the "write" conditions of a glow discharge cell of the switch network of FIG. 4;

FIG. 8 shows drive circuits and address logic in conformity with the invention for a glow discharge cell; and FIG. 9 shows glow discharge cell drive circuits suitable for producing the pulses of FIG. 1.

Figure 2:
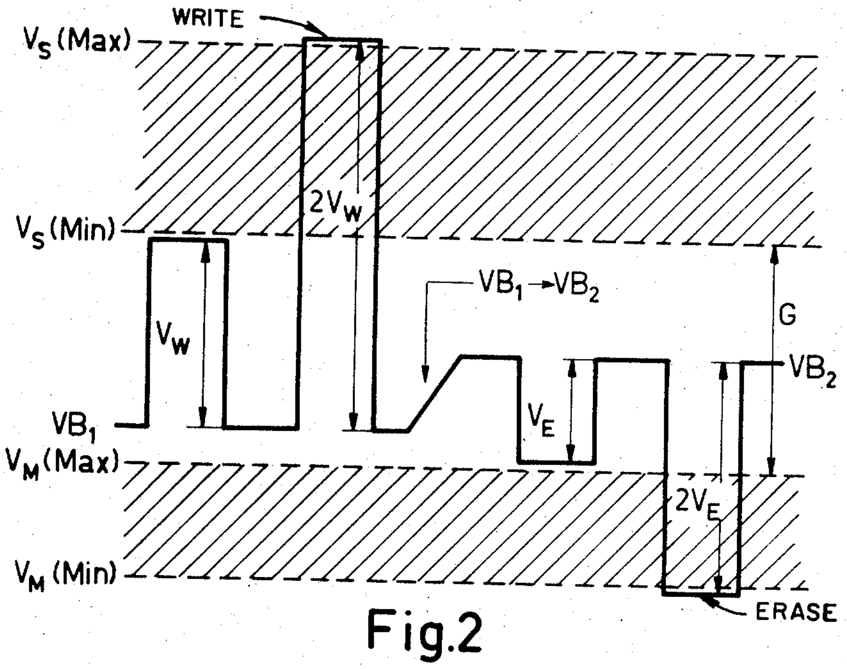
FIG. 2 shows pulses required for switched bias address conditions of a glow discharge cell in conformity with the invention.

Consider the case when conditions (ii) and (iv) referred to earlier are not simultaneously satisfied in accordance with the invention. This new situation is shown in FIG. 2 which shows write and erase pulse amplitudes and a switched bias voltage in conformity with the invention. In order to ignite any cell the low bias voltage $V_{B1}$ is selected to enable the maximum amplitude write pulses ($V_W$) to be used. In this instance:

$$V_{B1} + V_W < V_S(min)$$

$$V_{B1} + 2V_W > V_S(max)$$

$$V_{B1} < V_S(min) - [V_S\ (max) - V_S(min)]$$

$$V_{B1} > V_M(max)$$

Hence $$V_S(min) - V_M(max) > [V_S(max) - V_S(min)] \quad (v)$$

Thus the gap between $V_S$(min) and $V_M$(max) need now be greater than $V_S$ spread only. When erasing, the higher bias voltage $V_{B2}$ is selected for use in conjunction with two coincident erase pulses ($V_E$). The bias voltage $V_{B2}$ must be sufficiently large for a single erase pulse ($V_E$) not to extinguish any cell. In this instance:

$$V_{B2} < V_S(min)$$

$$V_{B2} - V_E > V_M(max)$$

$$V_{B2} - 2V_E < V_M(min)$$

Then $$V_S(min) - V_M(max) > [V_M(max) - V_M(min)] \quad (vi)$$

The gap need now be greater than $V_M$ spread only.

Both conditions (v) and (vi) are true, but (v) is the more stringent for most types of gas discharge structure. This means that with the switched bias operation either a smaller gap can be tolerated or a wider spread in strike voltage ($V_S$) for the matrix is permissible. The brightness uniformity of the cells will be improved during the static unaddressed condition (storage) by making the bias voltage $V_B$ as high as possible, but larger erase pulse amplitudes are then required.

The switched bias address conditions shown in FIG. 2 can be simplified by making the bias voltage $V_{B2}$ just less than $V_S$(min) so that the erase pulses ($V_E$) are equal to the write pulses ($V_W$) and to the difference in bias voltages ($V_{B2} - V_{B1}$). Then, only three equal amplitude pulses are required to operate the matrix.

Figure 3:
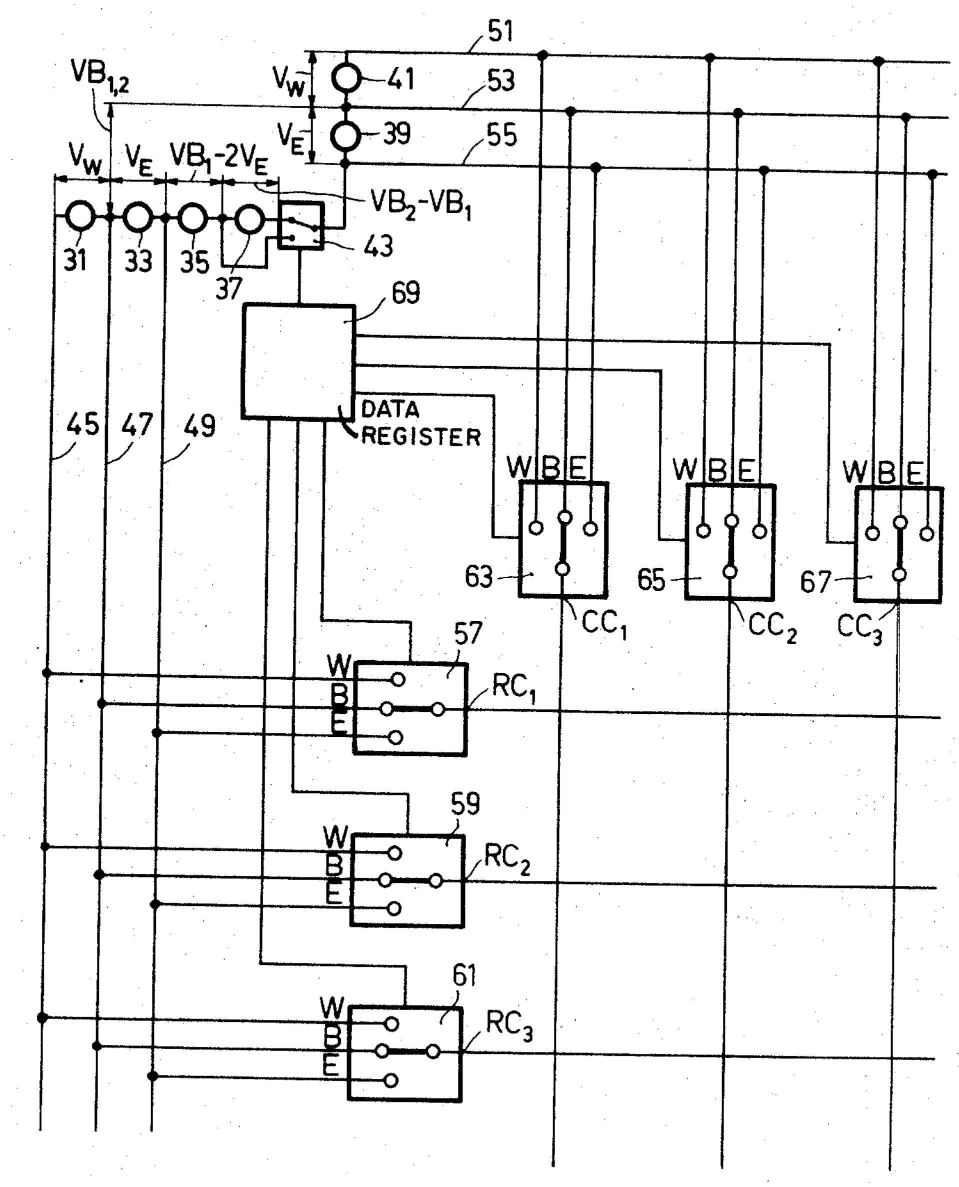

A 3-pulse cross bar drive network as shown in FIG. 3 can then be realized. In this network the cathode cross bar potential is selected by a three position switch $S_K$, whereas only a two position switch $S_A$ is required to select the anode cross bar potential.

The sequence of operations for operating such a network is shown in FIGS. 5*a*, 5*b*, 5*c* respectively. The cross bar voltages as selected by the anode and cathode switches $S_A$ and $S_K$ for the storage condition (unaddressed) are shown in FIG. 5*a*. Some of the cells are numbered 1 to 5 for future reference in FIGS. 5*b*, 5*c*, etc. FIG. 5*b* shows that all switches $S_K$ are set to $V_1$ and all switches $S_A$ are set to $V_4$. The shaded area represents the voltage across each of the numbered cells and this is again shown in FIG. 5*c* in relation to the spreads of $V_S$ and $V_M$ for the matrix. The voltage V4–V1 corresponds to the bias voltage $V_{B2}$ (FIG. 2) and is just less than the minimum strike voltage $V_S$(min) of the matrix to ensure that those cells which are already struck remain "on" at maximum brightness and uniformity.

In order to erase the discharge at a cell, the voltages across it are changed to those in FIG. 6*a* for cell No. 1. All cross bar voltages are as before except for the two-co-ordinates for cell No. 1 which are set to $V_2$ and $V_3$ for cathode and anode respectively. FIG. 6*b* shows the voltage appearing at each numbered cell and FIG. 6*c* compares the voltage across these cells with the discharge characteristics. It will be seen that cell No. 1 alone, will be extinguished, as it is only the voltage across this cell which falls below $V_M$(min). The cells (Nos. 4, 5, etc) having neither cross bar addressed will be unaffected, while the cells (Nos. 2, 3, etc) having one cross bar addressed will have a reduced voltage applied across them just above $V_M$(max) so that the discharges of these cells which are "on" will burn at considerably reduced current and brightness during the erase addressing period. The voltages V4–V3 and V2–V1 together correspond to the erase pulse $2V_E$ of FIG. 2.

In order to ignite the discharge at a cell (i.e., write), the voltages applied to the matrix are changed to those in FIG. 7*a* for cell No. 1. FIG. 7*b* shows the voltage appearing at each numbered cell and FIG. 7*c* compares the voltage across these cells with the discharge characteristics. In this instance, the appropriate cathode is switched to zero, the rest staying at $V_1$, but all anodes except the appropriate one are switched to voltage $V_3$, giving a voltage distribution on the cross bars as shown in FIG. 7*b*. The voltage V3–V1 corresponds to the bias voltage $V_{B1}$(FIG. 2) and is just greater than the maximum maintain voltage $V_M$(max) of the matrix to ensure that those cells which are already struck remain "on,"

but at considerably reduced brightness and current: this applies to cells (e.g., cells Nos. 4 and 5) having, in effect, neither cross bar addressed. The cells (e.g., cells Nos. 2 and 3) which have, in effect, one cross bar addressed remain at high current and maximum brightness because the addressing maintains the high bias voltage level.

When the display is being rapidly updated, the cells not being addressed (the majority) will be switched rapidly between the high and low bias voltages and so rapidly fluctuate in brightness, giving an intermediate brightness until the display is returned to the static storage condition.

The values for $V_1$, $V_2$, $V_3$ and $V_4$ for a particular cross bar matrix can readily be obtained from the following:

$$-V_E = V_W = V_P, \text{ say}$$

$$V_P \geq [V_S(\max) - V_S(\min)]$$

to include tolerances on voltage rails $$V_1 = V_p$$

$$V_2 = 2V_p$$

$$V_3 < V_S(\min)$$

$$V_4 = V_3 + V_p$$

Cathode and anode drive circuits for a 3-pulse cross bar drive network as explained above are shown in FIG. 8, together with the appropriate address logic in diagrammatic form. A simple transistor switch $T_3$ is used for the anode cross bar to select the voltages $V_3$ or $V_4$, while two transistor switches, $T_1$ and $T_2$ are used for the cathode cross bar to select one of the three voltages 0, $V_1$ or $V_2$. The X and Y position data is applied to the cathode and anode logic, respectively, via "enable" gates. A high output from these gates selects the conductive and non-conductive states of transistors $T_1$, $T_2$ and $T_3$ according to the function dictated by the mode input M; high for write or low for erase. The truth tables for this logic are shown in the tables below. Interface matching amplifiers are shown in the cathode circuit to match the positive logic to the n-p-n driver transistors T1 and T2 and also to isolate the grounded logic from $V_1$. The anode select logic may be at potential $V_4$ with AC coupling of the data input. The (common) mode input is a DC function and so would have to be either latched, or biased low (erase/storage mode) with AC coupling for the write level.

| ANODE | M | Q | E | Q | W | D1 | D2 | D3 | T3 | O/P | Function |
|---|---|---|---|---|---|---|---|---|---|---|---|
| | 0 | 1 | 1 | 0 | 0 | 0 | 1 | 1 | OFF | $V_3$ | ERASE |
| | 0 | 0 | 1 | 1 | 0 | 1 | 1 | 0 | ON | $V_4$ | STORE |
| | 1 | 1 | 0 | 0 | 1 | 1 | 1 | 0 | ON | $V_4$ | WRITE |
| | 1 | 0 | 0 | 1 | 1 | 1 | 0 | 1 | OFF | $V_3$ | (STORE) |

| CATHODE | M | Q | D | $T_1$ | $T_2$ | O/P | Function |
|---|---|---|---|---|---|---|---|
| | 0 | 1 | 1 | OFF | OFF | V2 | ERASE |
| | 0 | 0 | 1 | OFF | ON | V1 | STORE |
| | 1 | 1 | 0 | ON | OFF | V0 | WRITE |
| | 1 | 0 | 1 | OFF | ON | V1 | (STORE) |

The drive circuits of FIG. 8 require only four voltage rails V1, V2, V3 and V4, plus the O-rail. This compares favorably with the five voltage rails, plus a O-rail which would be required for drive circuits for a 4 -pulse system which provides the write and erase pulses of FIG. 1. An example of these latter drive circuits is shown in FIG. 9. With these drive circuits, the bias voltage ($V_B$ — FIG. 1) corresponds to V4–V1 transistors T2 and T3 being normally conductive to provide this bias voltage. For writing, transistors T2 and T3 are turned-off and transistors T1 and T4 are turned-on to increase the voltage across the cell to V4–0 which corresponds to the two write pulses $2V_W$ (FIG. 1). For erasing transistors T2 and T3 are turned-off (transistors T1 and T4 being maintained off) to reduce the voltage across the cell to V3–V2 which corresponds to the two erase pulses $2V_E$ (FIG. 1).

A schematic diagram for an electrical display device is shown in FIG. 3. The three-pulse drive network described above is equally suited to random point address, as has been considered up to now, or to "line dumping" address whereby several anode or cathode bars are addressed in parallel from a small temporary store. In fact, complete blocks ranging in size from one point, through rows and/or columns to the complete display could be switched on or off by parallel addressing of anode and/or cathode cross bars. The data registers used for row and column selection could take many forms such as shift registers loaded sequentially or in parallel, or static registers parallel loaded from a logic tree of combinations of these, instead of the sample basic tree/shift register used for point addressing. In all cases, the data registers are loaded, the mode signal is set, then the enable pulse activates the drive circuits accordingly. Thus, the present invention provides a switched bias voltage for a storage electrical display device of the kind referred to which enables wider matrix voltage spreads to be tolerated than for conventional systems using a fixed bias voltage. The special case when the difference between the two bias voltage levels is made equal to the writing and erasing pulse amplitudes has been described, by way of example. The resulting three-pulse drive network reduces the number of voltage rails from 5 to 4, considerably reduces the number of high voltage switching transistors required and improves the brightness uniformity of the display.

What I claim is:

1. A visual display device, comprising a plurality of light emitting elements arranged in rows and columns, each element having at least two terminals, each element activated to a light emitting condition in response to a first signal across the two terminals having an absolute value within a first predetermined voltage range, each element maintaining the light emitting condition in response to a second signal across the two terminals having an absolute value within a second predetermined voltage range, the highest voltage in the second predetermined voltage range having an absolute value less than that of the lowest voltage in the first predetermined voltage range, a row conductor connected to the first terminal of each element in a row of elements, a column conductor connected to the second terminals of each element in a column of elements, means for switching the display device selectively to a write mode and to an erase mode, input means for connecting the device to a plurality of reference potentials, a logic means responsive to the write mode of the display device for conducting to the row and column conductors those reference potentials from the input means having a first potential difference in the lower half of the second voltage range and for conducting to the row and column conductors in response to the erase mode of the display device those reference potentials from the input means having a second potential difference within the second voltage range and greater than the first potential difference, the logic means adding a third reference potential from the input means to a selected row conductor in response to a concurrence of the write mode of the display device and a first write command signal, the sum of the third reference potential and the first potential difference across the light emitting elements having an absolute value within the second voltage range, the logic means adding a fourth reference potential to a selected column conductor in response to a concurrence of the write mode of the device and a second write command signal, the sum of the fourth reference potential and the first potential difference across the light emitting elements having a value within the second voltage range, the sum of the first potential difference and the third and fourth reference potentials having a value in the first voltage range, the logic means adding a fifth reference potential from the input means to a selected row conductor in response to a concurrence of the erase mode of the device and a first erase command signal, the sum of the fifth reference potential and the second potential difference across the light emitting elements having a value within the second voltage range, the logic means adding a sixth reference potential from the input means to a selected column conductor in response to a concurrence of the erase mode of the device and a second erase command signal, the sum of the sixth reference potential and the second potential difference across the light emitting elements having a value in the second voltage range, the sum of the second potential difference and the fifth and sixth reference potentials across the light emitting elements having a value below that of the second voltage range.

2. A device as claimed in claim 1, wherein the absolute values of the third, fourth, fifth, and sixth reference potentials are equal.

3. An apparatus as claimed in claim 2, wherein the input means comprises five reference input terminals, wherein the first potential difference comprises the voltage between a second and a fourth of the reference input terminals, wherein the second potential difference comprises a voltage between a second and a fifth of the reference input terminals, wherein the third reference potential comprises a voltage between the fourth and fifth reference input terminals, wherein the fourth reference potential comprises a voltage between a first and a second reference input terminals, wherein the fifth reference potential comprises the voltage between the fourth and fifth reference input terminals, and wherein the sixth reference potential comprises a voltage between the second and the third reference input terminals.

* * * * *